Sept. 30, 1958
J. MACEWKA
2,853,857
FLUID PRESSURE UNIT
Filed March 8, 1954
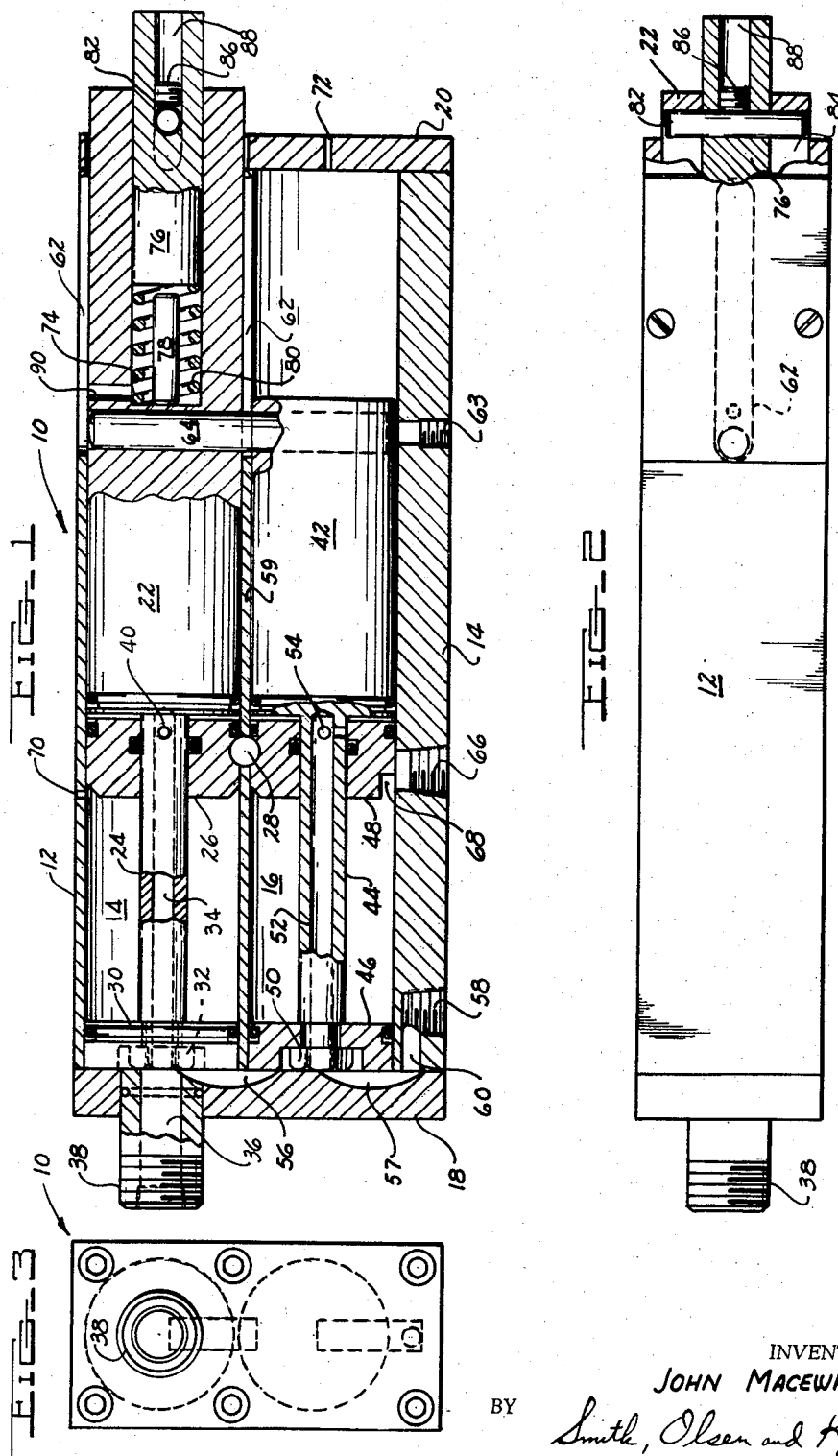
INVENTOR.
JOHN MACEWKA
BY Smith, Olsen and Kotts
ATTORNEYS

United States Patent Office 2,853,857
Patented Sept. 30, 1958

2,853,857

FLUID PRESSURE UNIT

John Macewka, Detroit, Mich.

Application March 8, 1954, Serial No. 414,722

3 Claims. (Cl. 60—97)

The present invention relates to a fluid pressure unit, and more particularly to a pneumatic welding gun having a plurality of tandem pistons disposed in parallel relation and also having a novel holding mechanism.

Prior to the present invention, whenever pneumatic welding guns have been used it has been necessary to use boosters and large secondary transformers in order to accomplish an effective weld. An efficient welding gun has been sought which would accomplish a good weld while remaining small in size and requiring a minimum amount of apparatus.

Prior welding guns have been unsatisfactory for another reason. Ordinarily when two strips of metal are spot-welded together, the welding tip hits the metal with a large force and the strips are forced together cold before they are heated by the welding tip. This causes welding flash and is conducive to the metal being deformed or humped at the welds.

The fluid pressure unit of the present invention, which is adapted for use in welding guns, is constructed to provide a large force. In addition, the welding tip is cushioned when it is moved against the strips to be welded As the metal is heated, the strips are automatically forced together to provide a smooth flat weld. The weld so obtained is so smooth that it need not be finished before plating.

It is a principal object of the present invention to provide a fluid pressure unit construction which is so constructed and arranged as to provide a maximum force from a relatively small line pressure.

It is another object of the present invention to provide a fluid pressure unit of small size and large capacity which is simple in construction and readily adapted to manufacture at practical costs.

It is a further object of the present invention to provide a welding gun construction which prevents undesirable deformation of the parts being welded and which provides a smooth efficient weld.

Other objects of this invention will appear in the following description and appended claims, reference being had to the accompanying drawings forming a part of this specification wherein like reference characters designate corresponding parts in the several views.

In the drawings:

Fig. 1 is a sectional elevation showing a fluid pressure unit embodying the present invention.

Fig. 2 is a top view, partly in section, of the fluid pressure unit shown in Fig. 1.

Fig. 3 is an end elevation of the fluid pressure unit shown in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the fluid pressure unit of the present invention includes a housing generally indicated by the number 10. The housing 10 comprises a body portion 12 which has two cylindrical bores 14 and 16 therein. End plates 18 and 20 are affixed to the ends of the body portion. An elongated piston 22 is disposed in the cylinder 14. The rightmost end of this piston extends out of the cylinder 14, and the leftmost end of the piston is affixed to a connecting rod 24. The connecting rod 24 extends through an insert or partition 26 which is rigidly affixed within the cylinder 14 by suitable means such as pin 28. The connecting rod 24 is affixed to a tandem piston 30 by a nut 32. A central passage 34 extends through the connecting rod 24 and nut 32 and communicates with the opening 36 of an air inlet member 38. The central passage 34 terminates at the right in an outlet 40. Thus, as air is introduced into the opening 36 of the air inlet member 38 from a suitable source of air pressure, the air acts upon the tandem piston 30 to move the tandem piston 30 and elongated piston 22 to the right. As the outlet 40 is uncovered, air is passed through the central passage 34 in the connecting rod 24 and out the outlet 40 to act upon the head of the elongated piston 22. In this manner a large effective piston area is available in a small diameter cylinder.

A similar elongated piston 42, connecting rod 44 and tandem piston 46 are provided in the cylinder 16. An insert or partition 48 separates the two pistons, and nut 50 having a central opening affixes the connecting rod to the tandem piston. The central passage 52 terminates in an outlet 54 which functions in the same manner as the outlet 40 in connecting rod 24.

The end plate 18 has two blind drilling recesses 56 and 57 therein. Recess 56 communicates with the opening 36 in the air inlet member 38 and extends over the end of central wall 59. Recess 56 also communicates with cylinders 14 and 16 so that air is distributed to both cylinders. A second air inlet is provided at 58. The inlet 58 communicates with recess 57 through an opening 60. In this manner there are two air inlets 38 and 58, either one of which can be used depending upon which is most convenient. When one inlet is used, the other is plugged.

A slot 62 is provided in the body member 12 and extends into both cylinders 14 and 16. This slot permits linear travel of a dowel pin 64 which is rigidly affixed to the pistons 22 and 42. It will be seen that the transverse connection by the dowel pin 64 effects simultaneous non-rotating movement of all the pistons. A hole 63 is provided in the other side of said body 12 so that dowel pin 64 may be knocked out when desired with a punch.

The return stroke is effected through an inlet 66 in the side of the cylinder body member 12. An opening 68 is formed in the insert 48 and communicates with the inlet 66 so that air pressure is exerted on the left face of tandem piston 46 when it is in its forward or rightmost position and extends closely adjacent the insert 48.

An opening 70 is provided in cylinder 14 at the left of the insert so that air may be exhausted as the tandem piston 30 moves to the right. A similar opening 72 is provided in the front plate 20 so that the air may be exhausted from the cylinder 16 as the elongated piston 42 moves to the right. The air to the left of the insert 48 is exhausted through the return inlet 66 as the tandem piston 46 moves to the right. Adjusting means may be provided at the opening 72 to adjust the rate of escape of air from the cylinder 16.

Suitable static and dynamic sealing rings are indicated where needed. Since a large number of such seals are used, they are not described in detail in order to avoid confusion.

The piston 22 is hollow at its rightmost end thus providing a chamber 74. Disposed within the chamber 74 is a plunger 76. A spacer pin 78 is positioned within the chamber 74, and a coil spring 80 surrounds the spacer pin and is partially compressed to a preloaded condition. The spacer pin prevents complete compression and resultant breakage of the spring by the plunger 76. A cross pin 82 is inserted through a slot 84 in the piston 22 and an aligned hole in plunger 76. In its normal position, the pin 82 extends within the guide slot 84 and the pin 82 and plunger 76 are thus guided in their travel. In order to maintain the cross pin 82 in its preselected position, a set screw 86 is inserted into the open end of the plunger 76 and is engaged with threads in the plunger opening 88 to move against the cross pin 82 and hold the same rigidly in position. The set screw may be removed or inserted by placing an Allen wrench into the opening 88 in the plunger 76.

An outlet 90 is provided in the side of piston 22 and communicates with an opening in the chamber 74 so that entrapped air may escape when plunger 76 moves into chamber 74.

Operation

The fluid pressure shown in the drawing is operated in a pneumatic welding gun as follows:

Air is introduced through the port 36 or 58. When one of these ports is used, the other is plugged. The air moves against the top of the tandem pistons 30 and 46 by virtue of the recess 56. This tends to move the tandem pistons to the right in the drawings, and since the tandem pistons 30 and 46 are connected to the main pistons 22 and 42 through the connecting rods 24 and 44, the main pistons tend to be moved by the tandem pistons. Air also travels through the passages 34 and 52 in the connecting rods to the outlets 40 and 54. As soon as the connecting rods 24 and 44 are moved to the right a sufficient distance so that the outlets 40 and 54 are moved out of the inserts 26 and 48, the air emitted from the outlets 40 and 54 acts against the heads of the elongated main pistons 22 and 42. Thus, the pressure acting against the pistons to move them to the right is the pressure per square inch times the effective area of both the main and tandem pistons.

Air in the leftmost portion of the cylinder 14 is exhausted through the opening 70 as the tandem piston 30 is moved to the right. Air in the leftmost portion of the cylinder 16 is exhausted through the opening 66 with the accompanying air line (not shown). This air line is affixed to a valve in conventional manner so that during one portion of the cycle it can be used as an exhaust line and during another portion of the cycle it is a feed line.

Air in cylinder 16 to the right of the main piston 42 is exhausted through the opening 72 as the piston is moved to the right. The size of the opening may be varied by any suitable means to adjust the resistance to the piston stroke.

As the main pistons 22 and 42 and tandem pistons 24 and 44 are moved to the right, the welding tip holder and welding tip (not shown) which are affixed to the free end of plunger 76 engage the pieces to be welded. As the pistons continue to move to the right, the plunger 76 moves back within the main piston 22 against the pressure of spring 80 until it contacts the spacer pin 78. Air in the chamber 74 is expelled out outlet 90. The spacer pin 78 prevents complete collapse of the spring 80. As the plunger 76 moves relative to the main piston 22, it is guided in straight non-rotating movement by the cross pin 82 in the guide slot 84 which is provided in the main piston 22. The main pistons and tandem pistons are prevented from rotating due to the dowel 64 which extends from main piston 22 through the connecting slot 62 in the housing 10 to main piston 42.

The workpiece is engaged by the welding tip (not shown) and current is passed through the workpiece from the welding tip. As the metal is heated, the preloaded spring 80 exerts a pressure against the plunger 76. The workpiece is thus firmly engaged while it is welded.

After the pistons have traveled the entire operating distance, air pressure is introduced through opening 66. This is the sole source of the return air pressure. Air is introduced through the opening 66 against the right face of the tandem piston 46, and this piston is moved to the left. Since tandem piston 46 is affixed to main piston 42 through connecting rod 44, main piston 42 is also moved to the left. Main piston 42 is connected to main piston 22 through the dowel 64 and main piston 22 is connected to tandem piston 30 through the connecting rod 24. Thus, all of the pistons are moved simultaneously to the left by introducing air through opening 66 against the right face of tandem piston 46.

When the pistons are thus being moved through the return stroke, the main piston 22 moves relative to the plunger 76 until cross pin 82 engages the rightmost wall of the slot 84 at which point the plunger 76 is moved with the main piston 22 by the cross pin 82. Air is exhausted out of the leftmost portions of the cylinders 14 and 16 through the port 38 which is the inlet port at the beginning of the cycle. The line which is affixed to port 38 is incorporated in a conventional valve mechanism which permits the port to be a pressure inlet during the beginning of the cycle and an outlet at the end of the cycle.

With the return portion of the cycle, the welding tip is held in engagement with the workpiece for a portion of time after the main and tandem pistons commence their return travel. This is due to the movement of main piston 22 relative to the plunger 76 the required distance until pin 82 engages the rightmost wall of the slot 84 in piston 22.

If the spring 80 should be broken, it is not necessary to disassemble the entire mechanism. The spring may be replaced by removing set screw 86 through passage 88 and knocking pin 82 out with a punch. Plunger 76 may then be removed and the spring 80 and spacer pin 78 dropped from the chamber 74. A new spring is then inserted into chamber 74 along with spacer pin 78. Plunger 76 is placed back in position and moved against spring 78 to the point where pin 82 can be inserted through the aligned openings in the piston 22 and plunger 76. After the cross pin 82 is replaced, the set screw 86 is drawn up against the pin 82.

From the foregoing description it will be seen that I have provided a simple and efficient fluid pressure unit which is particularly adapted for welding equipment. The spring loaded follow-up mechanism is very sensitive and is located close to the portion of the unit where the operational mechanism such as the point or electrode holder will be positioned.

Having thus described my invention, I claim:

1. In a fluid actuated unit having a housing with a cylinder therein, a piston having an elongated guide slot therein, a plunger chamber in said piston, a spacer member disposed in said chamber, a spring disposed around said spacer member, a plunger disposed in said chamber with one end adjacent said spacer member and spring and the free end extending out of said chamber, said plunger having an axial opening extending inwardly from the free end thereof, a pin disposed laterally through said plunger and extending within the elongated guide slot in said piston so that said plunger may move axially relative to said piston in a guided non-rotating path, said spring normally forcing said plunger a predetermined distance out of said chamber and said spacer preventing complete compression of said spring when a force is applied to the free end of the plunger against the force of said spring, and means disposed in the axial opening of the plunger against said pin for holding said pin in rigid engagement with said plunger during operation, said means being adapted for adjustment to permit easy removal of said pin from said piston and plunger when desired.

2. A double-acting fluid pressure unit comprising a housing, a plurality of parallel cylinders in said housing, said housing having an elongated connecting slot interconnecting said cylinders and also passing through an external wall of the housing, a plurality of main pistons one disposed in each of said cylinders and having surface portions adjacent opposite ends thereof forming a fluid seal with the cylinder and adapted to be acted upon by fluid under pressure, one of said main pistons extending out of its cylinder and having an elongated guide slot therein, a cross pin disposed within said connecting slot and connecting said main pistons together at their side portions, a plurality of tandem pistons one disposed in each cylinder in spaced relation to said main cylinder therein, a connecting rod in each cylinder and connecting the main piston to the tandem piston therein, said connecting rod having a central passage therethrough, means for connecting said cylinders to a source of fluid so that said fluid will act on one face of each of said tandem pistons and through the central passages in the connecting rods on one face of each of the main pistons in the operating stroke, means for acting on the opposite face of at least one of said pistons to effect the return stroke, a plunger chamber in one of said main pistons, a spacer member disposed in said chamber, a spring disposed around said spacer member, a plunger disposed in said chamber with one end adjacent said spacer member and spring and the free end extending out of said chamber, a pin disposed through said plunger and extending within the guide slot in said main piston so that said plunger may move axially relative to said piston in a guided non-rotating path, said spring normally forcing said plunger a predetermined distance out of said chamber and said spacer preventing complete compression of said spring when a force is applied to the free end of the plunger against the force of said spring.

3. In a fluid actuated unit having a housing with a cylinder therein, a piston having an elongated guide slot therein, a plunger chamber in said piston, a plunger disposed in said chamber with one end extending out of said chamber, compression spring means in the chamber acting to urge the plunger out of the chamber, said plunger having an axial opening extending inwardly from the free end thereof, a pin disposed laterally through said plunger and extending within the elongated guide slot in said piston so that said plunger may move axially relative to said piston in a guided non-rotating path, and means disposed in the axial opening of the plunger against said pin for holding said pin in rigid engagement with said plunger during operation, said means being adapted for adjustment to permit easy removal of said pin from said piston and plunger when desired.

References Cited in the file of this patent
UNITED STATES PATENTS

| | | |
|---|---|---|
| 446,799 | Thorpe | Feb. 17, 1891 |
| 825,866 | Rogers | July 10, 1906 |
| 1,954,427 | Platz | Apr. 10, 1934 |
| 2,151,712 | Newhall | Mar. 28, 1939 |
| 2,402,343 | Price | June 18, 1946 |
| 2,593,604 | Price | Apr. 22, 1952 |
| 2,642,138 | Macewka | June 16, 1953 |
| 2,661,599 | Folmer | Dec. 8, 1953 |
| 2,692,571 | Hardy | Oct. 26, 1954 |
| 2,698,603 | Macewka | Jan. 4, 1955 |